(12) United States Patent
Keyes et al.

(10) Patent No.: US 7,454,383 B2
(45) Date of Patent: Nov. 18, 2008

(54) METHODS AND SYSTEMS FOR ASSESSING LOAN PORTFOLIOS

(75) Inventors: Tim Kerry Keyes, West Redding, CT (US); Santosh Kumar Srinivas, Hyderabad (IN); Marshall Gaines Burchard, Seoul (KR); Catharine Lynn Midkiff, Bangkok (TH)

(73) Assignee: GE Corporate Financial Services, Inc., Norwalk, CT (US)

( * ) Notice: Subject to any disclaimer, the term of this patent is extended or adjusted under 35 U.S.C. 154(b) by 1222 days.

(21) Appl. No.: 10/035,968

(22) Filed: Dec. 31, 2001

(65) Prior Publication Data

US 2003/0126071 A1    Jul. 3, 2003

(51) Int. Cl.
*G06Q 40/00*    (2006.01)
(52) U.S. Cl. .............................. 705/38; 705/37; 705/36; 705/35
(58) Field of Classification Search ................. 364/401; 235/380; 705/38, 34, 36–37, 35
See application file for complete search history.

(56) References Cited

U.S. PATENT DOCUMENTS

| | | | |
|---|---|---|---|
| 5,550,734 A * | 8/1996 | Tarter et al. ..................... 705/2 |
| 5,644,727 A | 7/1997 | Atkins | |
| 5,704,044 A | 12/1997 | Tarter et al. | |
| 5,812,988 A * | 9/1998 | Sandretto ................... 705/36 R |
| 5,903,879 A | 5/1999 | Mitchell | |
| 6,078,903 A | 6/2000 | Kealhofer | |
| 6,112,190 A | 8/2000 | Fletcher et al. | |
| 6,134,536 A | 10/2000 | Shepherd | |
| 2001/0034686 A1 * | 10/2001 | Eder ............................ 705/36 |
| 2001/0034701 A1 * | 10/2001 | Fox et al. ....................... 705/38 |
| 2002/0152155 A1 * | 10/2002 | Greenwood et al. ........... 705/38 |
| 2003/0083973 A1 * | 5/2003 | Horsfall ....................... 705/37 |

OTHER PUBLICATIONS

Japan Will Issue Reply To Insurer's Queries—Regulator's Move Will Increase Transparency By Phred Dvorak. Asian Wall Street Journal. New York, N.Y.: Dec. 19, 2000. p. 1.*

* cited by examiner

*Primary Examiner*—Frantzy Poinvil
*Assistant Examiner*—Clement Graham
(74) *Attorney, Agent, or Firm*—Armstrong Teasdale LLP

(57) ABSTRACT

Methods and systems for assessing a loan portfolio for variance are described. In an example embodiment, the method comprises the steps of identifying a milestone for at least one loan in the portfolio at a selected time of assessment, determining planned collections for the loan for the selected time of assessment, determining actual collections for the loan the selected time period of assessment, and populating a spreadsheet identifying a current milestone and a cumulative variance between planned collections and actual collections at the milestone for the loan.

17 Claims, 13 Drawing Sheets

Table 50:

| Account Number | Jan-01 | Feb-01 | Mar-01 | Apr-01 |
|---|---|---|---|---|
| 12345 | 540 | 455 | 548 | 398 |
| 23456 | 652 | 461 | 136 | 18 |
| 34567 | 672 | 642 | 749 | 816 |

Table 52:

| Account Number | Month | Plan Amount |
|---|---|---|
| 12345 | Jan-01 | 540 |
| 12345 | Feb-01 | 455 |
| 12345 | Mar-01 | 548 |
| 12345 | Apr-01 | 398 |
| 23456 | Jan-01 | 652 |
| 23456 | Feb-01 | 461 |
| 23456 | Mar-01 | 136 |
| 23456 | Apr-01 | 18 |
| 34567 | Jan-01 | 672 |
| 34567 | Feb-01 | 642 |
| 34567 | Mar-01 | 749 |
| 34567 | Apr-01 | 816 |

FIG. 3

Table 54:

| Account Number | Month | Plan Amount |
|---|---|---|
| 12345 | Jan-01 | 540 |
| 12345 | Feb-01 | 455 |
| 12345 | Mar-01 | 548 |
| 12345 | Apr-01 | 398 |
| 23456 | Jan-01 | 652 |
| 23456 | Feb-01 | 461 |
| 23456 | Mar-01 | 136 |
| 23456 | Apr-01 | 18 |
| 34567 | Jan-01 | 672 |
| 34567 | Feb-01 | 642 |
| 34567 | Mar-01 | 749 |
| 34567 | Apr-01 | 816 |

Table 56:

| Account Number | Month Index | Plan Amount |
|---|---|---|
| 12345 | 3 | 540 |
| 12345 | 4 | 455 |
| 12345 | 5 | 548 |
| 12345 | 6 | 398 |
| 23456 | 3 | 652 |
| 23456 | 4 | 461 |
| 23456 | 5 | 136 |
| 23456 | 6 | 18 |
| 34567 | 3 | 672 |
| 34567 | 4 | 642 |
| 34567 | 5 | 749 |
| 34567 | 6 | 816 |

FIG. 4

| 102 Portfolio | (All) | 46 | | FIG. 9D - - - → |
|---|---|---|---|---|
| Collateral Type | (All) | | | |
| Size | (All) | | | |
| Bp Source | (All) | | | |
| CurrentStrategy | (All) | | | |

| | | Current Milestone | | |
|---|---|---|---|---|
| Last Milestone | Data | a) prior-to-approval | b) approved | c) approved-delinquent |
| a) prior-to-approval | Sum of Balance | 42,938,750 | 78,256 | - |
| | Accounts | 1,487 | 5 | - |
| | Cume Plan | 2,285,852 | 4,382 | - |
| | Cume Payments | 192,227 | 381 | - |
| | Cume Variance | (2,093,625) | (4,001) | - |
| | Current Plan | 193,192 | 606 | - |
| | Current Payments | 9,870 | 281 | - |
| | 30 Day Plan | 257,790 | 771 | - |
| | 31-60 Day Plan | 296,259 | 706 | - |
| | 61-90 Day Plan | 344,672 | 703 | - |
| b) approved | Sum of Balance | - | 1,646,454 | - |
| | Accounts | - | 32 | - |
| | Cume Plan | - | 285,670 | - |
| | Cume Payments | - | 85,640 | - |
| | Cume Variance | - | (200,030) | - |
| | Current Plan | - | 11,777 | - |
| | Current Payments | - | 2,764 | - |
| | 30 Day Plan | - | 3,634 | - |
| | 31-60 Day Plan | - | 16,434 | - |
| | 61-90 Day Plan | - | 7,661 | - |
| c) approved-delinquent | Sum of Balance | - | - | 3,405,285 |
| | Accounts | - | - | 65 |
| | Cume Plan | - | - | 236,691 |
| | Cume Payments | - | - | 29,683 |
| | Cume Variance | - | - | (207,008) |
| | Current Plan | - | - | 20,195 |
| | Current Payments | - | - | 85 |
| | 30 Day Plan | - | - | 101,927 |
| | 31-60 Day Plan | - | - | 14,208 |
| | 61-90 Day Plan | - | - | 99,882 |
| d) closed | Sum of Balance | - | - | 7,215 |
| | Accounts | - | - | 2 |
| | Cume Plan | - | - | 376 |
| | Cume Payments | - | - | 240 |
| | Cume Variance | - | - | (136) |
| | Current Plan | - | - | 52 |
| | Current Payments | - | - | - |
| | 30 Day Plan | - | - | 62 |
| | 31-60 Day Plan | - | - | 57 |
| | 61-90 Day Plan | - | - | 57 |

| | | | | |
|---|---|---|---|---|
| e) closed-delinquent | Sum of Balance | - | - | - |
| | Accounts | - | - | - |
| | Cume Plan | - | - | - |
| | Cume Payments | - | - | - |
| | Cume Variance | - | - | - |
| | Current Plan | - | - | - |
| | Current Payments | - | - | - |
| | 30 Day Plan | - | - | - |
| | 31-60 Day Plan | - | - | - |
| | 61-90 Day Plan | - | - | - |
| f) PIF | Sum of Balance | - | - | - |
| | Accounts | - | - | - |
| | Cume Plan | - | - | - |
| | Cume Payments | - | - | - |
| | Cume Variance | - | - | - |
| | Current Plan | - | - | - |
| | Current Payments | - | - | - |
| | 30 Day Plan | - | - | - |
| | 31-60 Day Plan | - | - | - |
| | 61-90 Day Plan | - | - | - |
| g) prev PIF | Sum of Balance | - | - | - |
| | Accounts | - | - | - |
| | Cume Plan | - | - | - |
| | Cume Payments | - | - | - |
| | Cume Variance | - | - | - |
| | Current Plan | - | - | - |
| | Current Payments | - | - | - |
| | 30 Day Plan | - | - | - |
| | 31-60 Day Plan | - | - | - |
| | 61-90 Day Plan | - | - | - |
| h) no CFID | Sum of Balance | - | - | - |
| | Accounts | - | - | - |
| | Cume Plan | - | - | - |
| | Cume Payments | - | - | - |
| | Cume Variance | - | - | - |
| | Current Plan | - | - | - |
| | Current Payments | - | - | - |
| | 30 Day Plan | - | - | - |
| | 31-60 Day Plan | - | - | - |
| | 61-90 Day Plan | - | - | - |

| i) No Milestone | Sum of Balance | - | - | - |
|---|---|---|---|---|
| | Accounts | - | - | - |
| | Cume Plan | - | - | - |
| | Cume Payments | - | - | - |
| | Cume Variance | - | - | - |
| | Current Plan | - | - | - |
| | Current Payments | - | - | - |
| | 30 Day Plan | - | - | - |
| | 31-60 Day Plan | - | - | - |
| | 61-90 Day Plan | - | - | - |
| Total Sum of Balance | | 42,938,750 | 1,724,811 | 3,412,500 |
| Total Accounts | | 1,487 | 37 | 67 |
| Total Cume Plan | | 2,285,852 | 290,052 | 237,067 |
| Total Cume Payments | | 192,227 | 86,021 | 29,923 |
| Total Cume Variance | | (2,093,625) | (204,032) | (207,144) |
| Total Current Plan | | 193,192 | 12,383 | 20,247 |
| Total Current Payments | | 9,870 | 3,045 | 85 |
| Total 30 Day Plan | | 257,790 | 4,405 | 101,969 |
| Total 31-60 Day Plan | | 298,259 | 17,140 | 14,265 |
| Total 61-90 Day Plan | | 344,672 | 6,364 | 99,939 |

FIG. 9C

| d) closed | e) closed-delinquent | f) PIF | g) prev PIF | h) no CFID | i) No Milestone | Grand Total |
|---|---|---|---|---|---|---|
| - | - | - | - | - | - | 43,017,107 |
| - | - | - | - | - | - | 1,492 |
| - | - | - | - | - | - | 2,290,234 |
| - | - | - | - | - | - | 192,606 |
| - | - | - | - | - | - | (2,097,626) |
| - | - | - | - | - | - | 193,798 |
| - | - | - | - | - | - | 10,151 |
| - | - | - | - | - | - | 258,560 |
| - | - | - | - | - | - | 298,965 |
| - | - | - | - | - | - | 345,375 |
| 16,399 | - | 122 | - | - | - | 1,662,975 |
| 2 | - | 1 | - | - | - | 35 |
| 1,882 | - | 8 | - | - | - | 287,561 |
| 671 | - | 15 | - | - | - | 86,326 |
| (1,211) | - | 7 | - | - | - | (201,235) |
| 608 | - | 1 | - | - | - | 12,387 |
| - | - | 15 | - | - | - | 2,779 |
| 103 | - | 1 | - | - | - | 3,738 |
| 96 | - | 1 | - | - | - | 16,531 |
| 98 | - | 1 | - | - | - | 7,760 |
| - | - | - | - | - | - | 3,405,285 |
| - | - | - | - | - | - | 65 |
| - | - | - | - | - | - | 236,691 |
| - | - | - | - | - | - | 29,683 |
| - | - | - | - | - | - | (207,008) |
| - | - | - | - | - | - | 20,195 |
| - | - | - | - | - | - | 85 |
| - | - | - | - | - | - | 101,927 |
| - | - | - | - | - | - | 14,208 |
| - | - | - | - | - | - | 99,882 |
| 13,416,607 | 141,605 | 138,691 | - | - | - | 13,704,118 |
| 342 | 3 | 4 | - | - | - | 349 |
| 1,894,567 | 53,977 | 40,132 | - | - | - | 1,989,053 |
| 2,056,555 | 8,119 | 47,009 | - | - | - | 2,111,923 |
| 161,988 | (45,858) | 6,876 | - | - | - | 122,870 |
| 152,818 | 70 | 118 | - | - | - | 153,059 |
| 67,991 | - | 15,999 | - | - | - | 83,990 |
| 87,709 | 90 | 130 | - | - | - | 87,990 |
| 286,861 | 82 | 116 | - | - | - | 287,115 |
| 116,556 | 81 | 118 | - | - | - | 116,812 |

| | | | FIG. 9D | | |
|---|---|---|---|---|---|
| - | 4,079,223 | - | - | - | 4,079,223 |
| - | 87 | - | - | - | 87 |
| - | 780,463 | - | - | - | 780,463 |
| - | 212,658 | - | - | - | 212,658 |
| - | (567,805) | - | - | - | (567,805) |
| - | 28,900 | - | - | - | 28,900 |
| - | 16 | - | - | - | 16 |
| - | 18,094 | - | - | - | 18,094 |
| - | 57,295 | - | - | - | 57,295 |
| - | 40,622 | - | - | - | 40,622 |
| - | - | 11,768,254 | - | - | 11,768,254 |
| - | - | 487 | - | - | 487 |
| - | - | 2,631,985 | - | - | 2,631,985 |
| - | - | 3,944,607 | - | - | 3,944,607 |
| - | - | 1,312,622 | - | - | 1,312,622 |
| - | - | 60,933 | - | - | 60,933 |
| - | - | 73 | - | - | 73 |
| - | - | 91,215 | - | - | 91,215 |
| - | - | 156,347 | - | - | 156,347 |
| - | - | 110,619 | - | - | 110,619 |
| - | - | - | 26,613,696 | - | 26,613,696 |
| - | - | - | 859 | - | 859 |
| - | - | - | - | - | - |
| - | - | - | 11,547,101 | - | 11,547,101 |
| - | - | - | 11,547,101 | - | 11,547,101 |
| - | - | - | - | - | - |
| - | - | - | - | - | - |
| - | - | - | - | - | - |
| - | - | - | - | - | - |
| - | - | - | - | - | - |
| - | - | - | - | 3 | 3 |
| - | - | - | - | - | - |
| - | - | - | - | 15,303 | 15,303 |
| - | - | - | - | 15,303 | 15,303 |
| - | - | - | - | - | - |
| - | - | - | - | - | - |
| - | - | - | - | - | - |
| - | - | - | - | - | - |
| - | - | - | - | - | - |

| | | | | | | |
|---:|---:|---:|---:|---:|---:|---:|
| - | - | - | - | - | 18,000 | 16,000 |
| - | - | - | - | - | 1 | 1 |
| - | - | - | - | - | 665 | 665 |
| - | - | - | - | - | - | - |
| - | - | - | - | - | (665) | (665) |
| - | - | - | - | - | 91 | 91 |
| - | - | - | - | - | - | - |
| - | - | - | - | - | 117 | 117 |
| - | - | - | - | - | 2,527 | 2,527 |
| - | - | - | - | - | 107 | 107 |
| 13,433,006 | 4,220,828 | 11,907,067 | 26,613,696 | - | 18,000 | 104,268,658 |
| 344 | 90 | 491 | 859 | 3 | 1 | 3,376 |
| 1,896,449 | 834,440 | 2,672,126 | - | - | 665 | 8,216,651 |
| 2,057,226 | 220,777 | 3,991,631 | 11,547,101 | 15,303 | - | 18,140,208 |
| 160,776 | (613,663) | 1,319,505 | 11,547,101 | 15,303 | (665) | 9,923,556 |
| 153,427 | 28,970 | 61,053 | - | - | 91 | 469,362 |
| 67,991 | 16 | 16,087 | - | - | - | 97,094 |
| 87,812 | 18,184 | 91,346 | - | - | 117 | 561,642 |
| 286,957 | 57,377 | 156,464 | - | - | 2,527 | 832,988 |
| 116,653 | 40,703 | 110,739 | - | - | 107 | 721,177 |

FIG. 9F

METHODS AND SYSTEMS FOR ASSESSING LOAN PORTFOLIOS

BACKGROUND OF THE INVENTION

This invention relates generally to assessing loan portfolios, and more specifically, to assessing collections variance in non-performing loan portfolios.

The term "loan portfolio" refers to a group of loans related by, for example, market segment or a geographic market. For example, a loan portfolio may consist of thousands of automobile loans in a particular country. A non-performing loan portfolio is a loan portfolio in which each loan is in late stages of delinquency (i.e., has many payments due). The term "variance" refers in this context to a difference between actual payments and planned payments arising from a re-negotiation.

A lender may have many non-performing loans (e.g., 10,000 to 20,000 loans) having a total value of billions of dollars, worldwide. Management of non-performing loan portfolios typically involves monitoring the productivity and yield of the overall collection process, and its constituent steps. More specifically, managing non-performing loans involves administration of the following matters:
- status of borrower negotiations, as asset managers work with borrowers through a series of standard settlement milestones,
- annual business plans established for each borrower in each portfolio, ascribing the expected amount and timing of cash flows, and collection method strategy,
- actual monthly payments made by each borrower to retire the debt, and
- account characteristics (borrower, loan, collateral, asset manager).

A lender may seek investors to participate in the risk and rewards associated with acquiring and managing non-performing loan portfolios. Among typical investor requests in connection with non-performing portfolios the investor owns, or is considering investing in, are forecasts of monthly amounts collected for each portfolio up to one year in advance, as well as detailed explanations of actual differences or variances from the targeted, or planned, collection amounts.

BRIEF SUMMARY OF THE INVENTION

In one aspect, a method for assessing a loan portfolio for variance is provided. In an example embodiment, the method comprises the steps of identifying a milestone for at least one loan in the portfolio at a selected time of assessment, determining planned collections for the loan for the selected time of assessment, determining actual collections for the loan for the selected time period of assessment, and populating a spreadsheet identifying a current milestone and a cumulative variance between planned collections and actual collections at the milestone for the loan.

In another aspect, a database for a variance tracking system is provided. The database comprises a memory storage having data stored therein, and the data comprises a milestone status for each of a plurality of loans, planned payments for each loan, actual payments for a plurality of loans, and indexes of time associated with each planned payment and with each actual payment.

In yet another aspect, a computer program for controlling operation of a computer to determine variance in a loan portfolio is provided. In an example embodiment, the computer program is executable to control the computer to associate each loan in the portfolio with one of a plurality of milestones, determine cumulative planned collections for a selected loan for the selected time of assessment, determine cumulative actual collections for the loan for the selected time period of assessment, and determine a cumulative variance for the loan for the selected time period of assessment based on the cumulative planned collections and cumulative actual collections.

In still yet another aspect, a variance tracker system for tracking variance in a loan portfolio is provided. The system comprises a database comprising a memory storage having data stored therein. The data comprises a milestone status for each of a plurality of loans, planned payments for each loan, actual payments for a plurality of loans, and indexes of time associated with each planned payment and with each actual payment. The system further comprises a processor coupled to the database. The processor is programmed to associate each loan in the portfolio with one of a plurality of milestones, determine cumulative planned collections for a selected loan for the selected time of assessment, determine cumulative actual collections for the loan for the selected time period of assessment, and determine a cumulative variance for the loan for the selected time period of assessment based on the cumulative planned collections and cumulative actual collections.

BRIEF DESCRIPTION OF THE DRAWINGS

FIG. 3 illustrates normalization of an initial plan matrix;

FIG. 4 illustrates coding planned payments;

FIG. 9A is a first portion of the illustrated transition inventory display.

FIG. 9B is a second portion of the illustrated transition inventory display

FIG. 9C is a third portion of the illustrated transition inventory display.

FIG. 9D is a fourth portion of the illustrated transition inventory display.

FIG. 9E is a fifth portion of the illustrated transition inventory display.

FIG. 9F is a sixth portion of the illustrated transition inventory display;

DETAILED DESCRIPTION OF THE INVENTION

Set forth below is a description of an information management system for tracking portfolio variance of non-performing loan portfolios. The technical effect produced by the system is the generation of a spreadsheet for analyzing and understanding variances between planned and actual performance at the portfolio level, and improved forecast capability for near and long term.

In an example embodiment, the variance tracking system is implemented on a personal computer in a Microsoft Office operating system environment. Microsoft Office software is commercially available from Microsoft Corporation, Redmond, Wash. A spreadsheet program, such as Excel (also commercially available from Microsoft Corporation) is loaded into the personal computer. A data management system, such as Access (also commercially available from Microsoft Corporation) also is loaded into the personal computer. Of course, other operating systems, other spreadsheet programs, and other data management systems can be utilized. In addition, the processor need not be in the form of a personal computer. The processor selected need only be capable of performing the processing described herein to be utilized.

The example system described below tracks plan versus actual collections for non-performing loan portfolios. In addition, the system enables an end-user to dynamically rank portfolio segments (or borrowers) by their contribution to plan versus actual collections variance.

Figure 1:
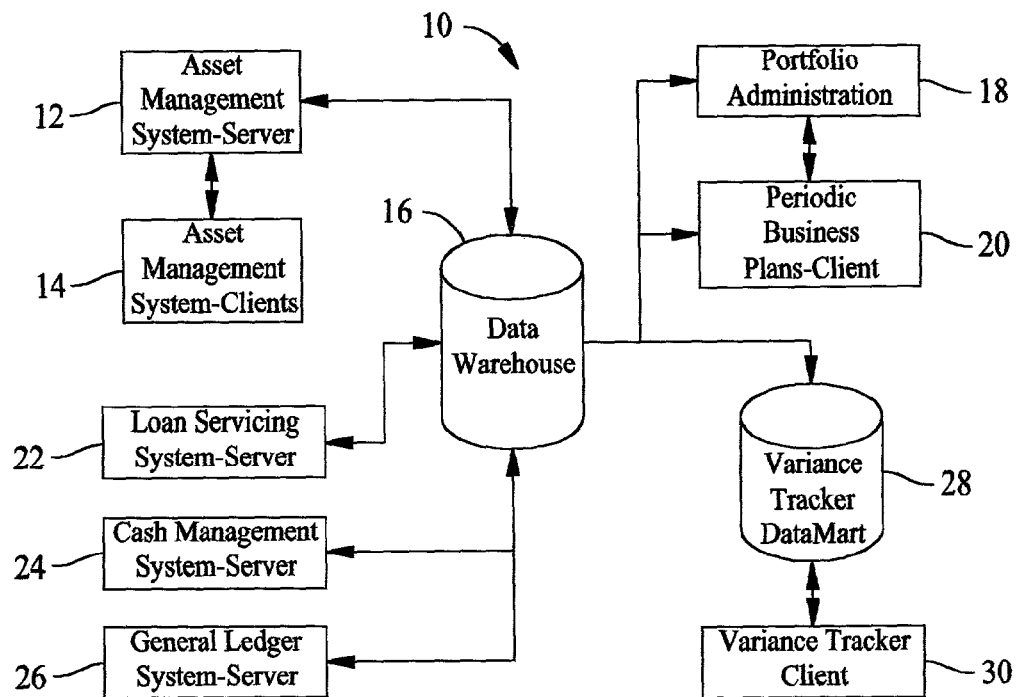
FIG. 1 is block diagram of one embodiment of an asset management information system.

Referring now specifically to the drawings, FIG. 1 is a block diagram 10 illustrating an example embodiment of an information system for variance tracking. A system server 12 provides users with access to operational information for asset management 14, recorded into a data warehouse 16 in an ongoing basis from other applications residing on a network, e.g., a local area network. The data warehouse 16, in an example embodiment, is an Oracle database, commercially available from Oracle Corporation, Redwood Shores, Calif.

The information stored in data warehouse 16 includes, for example:

Borrower Contact Information,

Contact Action/Results History,

Borrower Characteristics (e.g., size of outstanding balance, nature of collateral security, lien information, historical payment performance, litigation status, and underwritten valuation), and Asset Management Milestones (with corresponding dates and expected "recovery" amounts where appropriate*): Not Contacted, In Negotiation, Scheduled for Approval, Approved*, Approved Delinquent, Closed*, Closed Delinquent, Paid-In-Full, and Foreclosed*.

Portfolio administrators 18 construct periodic (e.g., annual, quarterly) business plans 20 for debtor groups (e.g., individuals, borrower alliances, and portfolio segments). The business plans 20 include the expected monthly cash payments made by the debtor groups. The time horizon (beginning month to ending month) of the business plans 20 for each debtor group is the same (e.g., January 2001 to December 2005).

Portfolio administrators 18 choose among various available borrower, loan, and collateral characteristics pertaining to the debtor group. These characteristics are used for subsequent "data mining" purposes (e.g., prioritizing debtor groups, stratified by their common group characteristics, according to each stratum's contribution to an overall variance calculation as described below).

Once debtor groups have progressed through asset milestone phases and achieve a negotiated settlement (i.e., are "closed"), loan servicing 22 issues notification of contractual cash payments. As payments are received, they are posted in a cash management system 24, from which general ledger 26 accounting entries are made. For non-performing loans, these contractual cash flows usually sum to considerably less than the balance owed to the original credit issuer. A purchaser of non-performing loan portfolios (from the original credit issuer or subsequent purchaser) aims to collect more than his/her purchase price for each debtor group in the portfolio.

The systems and methods described herein facilitate determining how well the periodic business plans are borne out in reality and in addition, allow for the identification of portfolio segments (strata) which are the chief contributors to slippages (or accelerations) in actual payments made, as compared to the business plans (or contractual cash flows). These functions are sometimes referred to herein as variance tracking. Such functions are performed in the system illustrated in FIG. 1 by the variance tracker database 28 (illustrated in FIG. 1 and sometimes referred to herein as the variance tracker DataMart) and the variance tracker client 30. More specifically, data from data warehouse 16 and from the business plans 20 is stored in database 28, and variance tracker client 30 is an application program executed by the personal computer to perform the functions described above (i.e., variance tracking).

Figure 2:
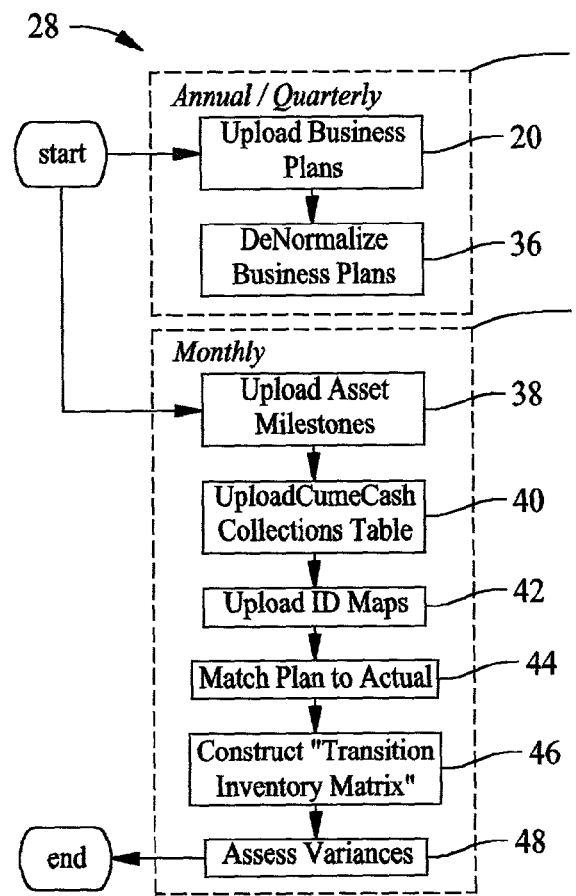
FIG. 2 is a process map for tracking portfolio variance.

More particularly, and referring to FIG. 2, variance tracker database 28, i.e., DataMart, is created by performing certain tasks on an annual/quarterly and monthly basis. For example, business plans 20 are created on an annual or quarterly basis. The DataMart 28 is data stored on the personal computer memory utilizing the data management system 12 (e.g., the Access data management system), as described above. The plans 20 are comprised of expected monthly cash flows for each debtor group, and are uploaded to variance tracker DataMart 28. Business plans 20 can be for a single borrower, borrower alliances, and portfolio segments.

The business plans 20 are usually created in a normalized format (i.e., a matrix format—with debtor group ID's in rows, and monthly expected payments in columns). The normalized format is converted to a de-normalized 36, or list-oriented, version of the business plan 20. The number of months between a starting month and each payment month—a Time Series ID—is assigned (i.e., monitoring may start in January, 2001, and payments made in May, 2001, June, 2001, or months 5 and 6, respectively) to each plan 20. De-normalization 36 occurs each time business plans 20 are uploaded.

On a monthly basis, debtors progress through a standardized series of asset milestones. Monitoring the transition of borrowers through these critical junctures provides indication of the asset management performance. The asset milestone 38 progress therefore is tracked and organized by asset ID. In addition, actual cash collections in each month are uploaded and assigned a Time Series ID. The cumulative cash collections 40 (Cume Cash Collections) are organized by SubAsset ID and by Asset ID in a table format. As cash payments may be tracked at a different level (e.g., by loan) than that of other database entities (e.g., asset milestones, data mining characteristics, business plans), a map associating these different levels (ID Maps 42) is updated and uploaded. Specifically, the ID Map 42 associates Asset ID and SubAsset ID to specific loans. Expected payments from business plans for each debtor group, for each time series ID is associated, or linked 44, with actual payments, aggregated from SubAsset ID to Asset ID (debtor group ID) by Time Series ID.

Appendix A contains database schematics (DS) that can be utilized in building one example embodiment of variance tracker DataMart 28. Specifically, DS 1 is a database schematic for the CFIDs (a.k.a., "Cash Flow ID's"), DS 2 is for payment data, DS 3 is for approved (i.e., accepted by investors) business plans, DS 4 is for large (i.e., borrowers with large balances) business plans, DS 5 is for buckets (i.e., portfolio segments) business plan, DS 6 is for business plan totals, DS 7 is for milestones, DS 8 is for CFIDs without business plans, DS 9 is for variance tracking data, DS 10 is for variance tracking data, DS 10 is for subtype export data, and DS 11 is for subtype export data.

Once a DataMart 28 is created, then a variance tracker client 30 is utilized to generate a transition inventory matrix 46, which illustrates key portfolio statistics and variance calculations for any selected (drilled-down) segment of the portfolio, and by asset milestone one-month status changes. The matrix is generated by the personal computer using, for example, the Excel spreadsheet program, as described above. A transition inventory matrix can be created for any historical month, beginning with the first month of portfolio monitoring. Using the transition inventory matrix 46, sources and movements over time of borrowers, payments, and variances can be assessed 48. Such assessment 48 can be utilized to better identify asset management process improvements, resulting in an improved ability to manage strategic operations.

FIGS. 3-9F illustrate one example of creating DataMart 28 and constructing a transition inventory matrix 46. More particularly, FIG. 3 illustrates normalization of a business plan 20. Specifically, from an initial plan matrix 50 which depicts accounts (rows) across plan months (columns), normalization creates a list-oriented format 52 which is useful for subsequent matching.

Planned payments are then coded as illustrated in FIG. 4. Such coding refers to translating the contents of a time field 54 (in the example, a "Month") into an index of time 56, namely, identify the number of months from a selected point in time to which the record pertains. For example, if the selected point in time is November, 2000 (i.e., November, 2000= month index 1), then the month of January, 2001 corresponds to a month index of 3 as illustrated in FIG. 4.

Figure 5:
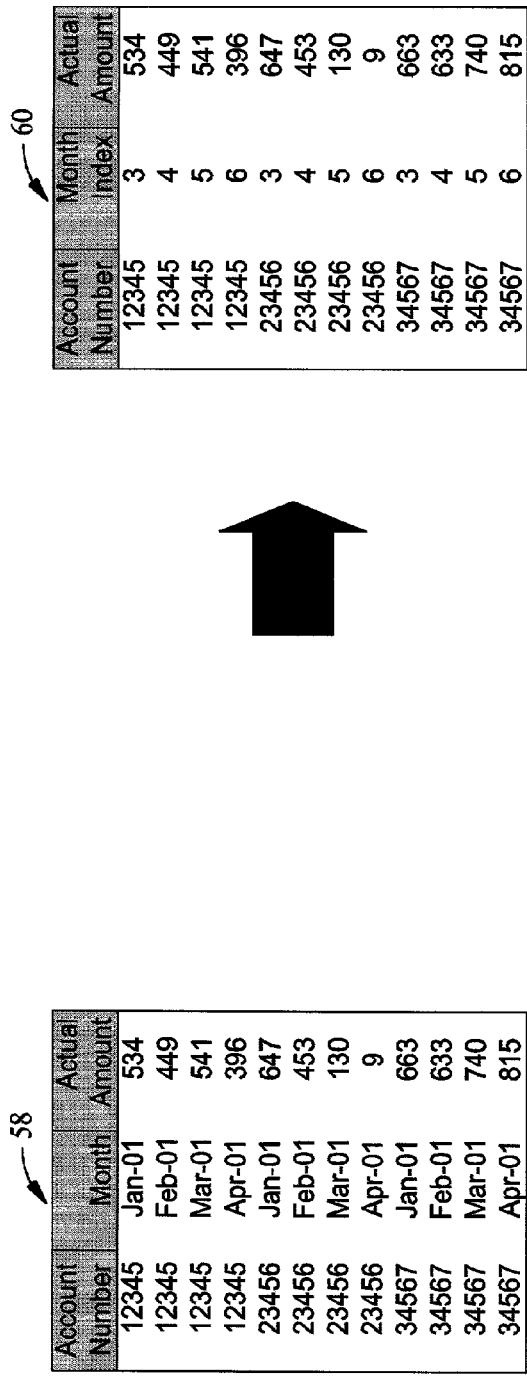
FIG. 5 illustrates coding actual payments.

Actual payments 58 also are coded 60, as illustrated in FIG. 5. The same coding methodology utilized to code the planned payments is utilized to code the actual payments.

Figure 6:
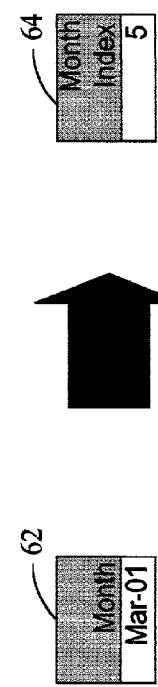
FIG. 6 illustrates indexing time of assessment.

Referring now to FIG. 6, and for variance analysis of cumulative plan versus actual differences, from a specific point in time through a current month 62 (e.g., from November, 2000 through March, 2001), the user must specify the index of the time assessment (in the example, month index 5). By so specifying the month index 64, then a transition inventory matrix 46 can be created for assessment.

Figure 7:
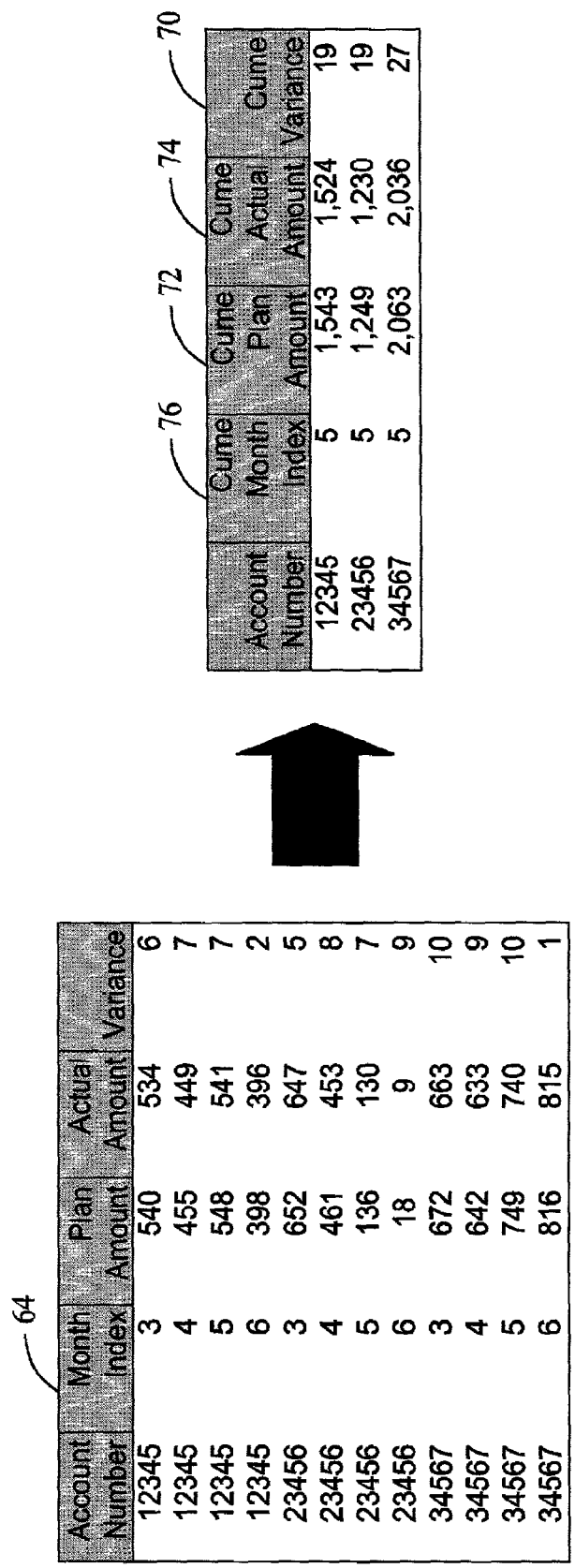
FIG. 7 illustrates matching and cumulative variance.

Once the month index 64 is specified, then as shown in FIG. 7, matching and cumulative variance through the specified period of time can be determined. Cumulative (cume) variance 70 is the difference between cume plan 72 and cume actual 74 up through and including the time of assessment 76 (in the example, the $5^{th}$ month index).

Figure 8:
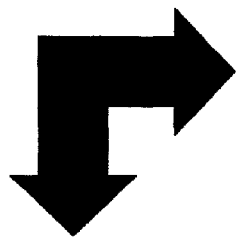
FIG. 8 illustrates transition inventories.

Referring to FIG. 8, the cume variance 70 can be performed for any desired time of assessment 76. Assessments between two different time periods 80, 82 are used to create a transition inventory matrix 46, which illustrates how accounts move through a management system, and which accounts are producing the largest contribution to cume variance. In the example illustrated in FIG. 8, accounts that were approved 84 and previously closed currently 86 are producing 28 units of cume variance. Accounts that were closed previously 88 and now delinquent 90 are also producing this amount of cume variance.

FIGS. 9A-F illustrate a transaction inventory matrix 46 representing an assessment of 3376 accounts. The matrix is created using, for example, the Excel spreadsheet program commercially available from Microsoft Corporation, Redmond, Wash. The spreadsheet is populated using the data stored in DataMart 28 and based on the time period selected by the analyst for assessment.

Typically, accounts will advance in management milestones from one month (or time of assessment) to the next. Bottlenecks can be identified by accumulation of variance. In the example shown in FIGS. 9A-F, accounts which are 'prior to-approval' 100 in both the current and previous periods (1487 accounts) have generated the greatest amount of plan versus actual variance (approximately -2 MM currency units).

Using the pivot tables in the Excel program, an analyst can "drill down" using account characteristics that may be drivers of variance. More particularly, and in the example shown in FIGS. 9A-F, in the upper left hand corner of the pivot tables, five variables 102 are listed. These variables 102 can be used to isolate problematic account segments. An analyst simply uses the 'drop down' boxes to select an account segment (for example, "Real Estate Secured" as an attribute of the characteristic "Collateral Type"). The pivot table is automatically updated to reflect the selected segment's contribution to variance. Account segments can be rank-ordered in terms of their contribution.

Figure 10:
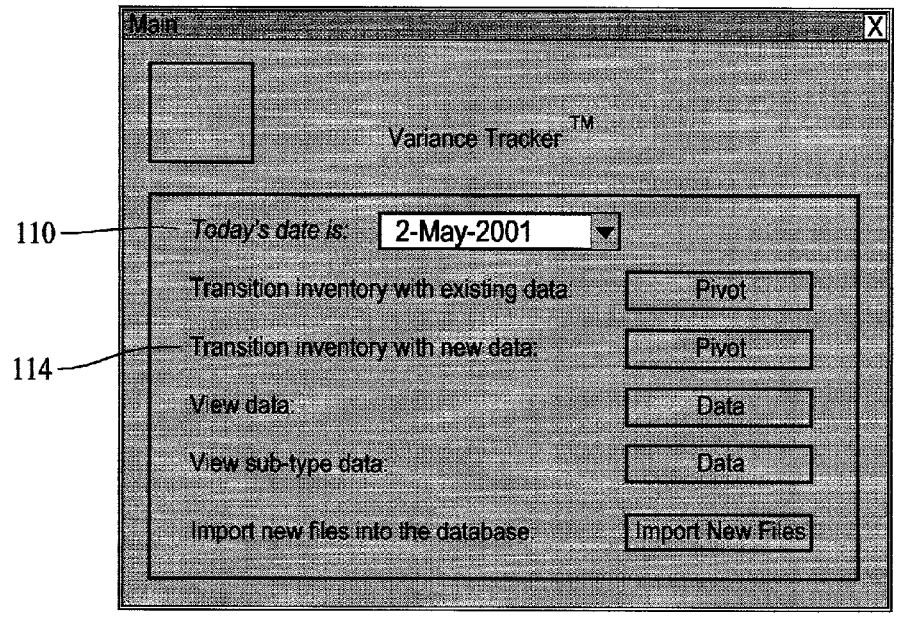
FIG. 10 is a screen shot of an example user interface.
Figure 11:
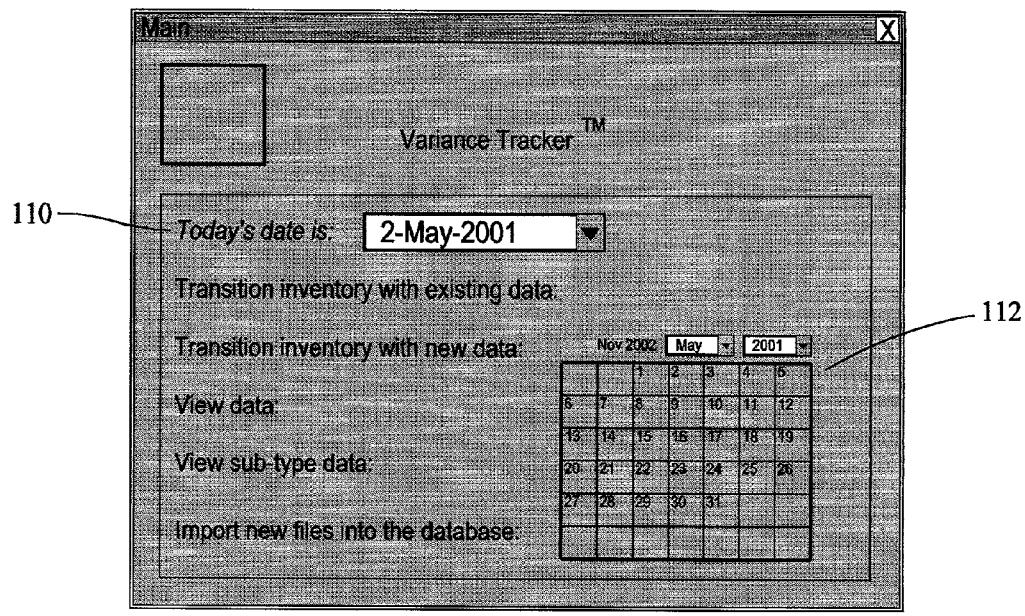
FIG. 11 is a screen shot of a date selection screen for use in connection with the example user interface shown in FIG. 10.

Example user interfaces are described below in connection with FIGS. 10-13. Of course, many different formats and selections can be utilized for the user interface and the user interfaces illustrated below in FIGS. 10-13 are example user interfaces. FIG. 10 is a screen shot of an example user interface. A date selection 110 (i.e., Today's date is) points to a current date as a default. The date can be changed by selecting a drop down button. Once the drop down button is selected, a calendar 112, as shown in FIG. 11, is displayed. A new date is selected by 'double clicking' on the desired date. Once the date is selected, the user then selects "Transistion Inventory with new data" 114.

Figure 12:
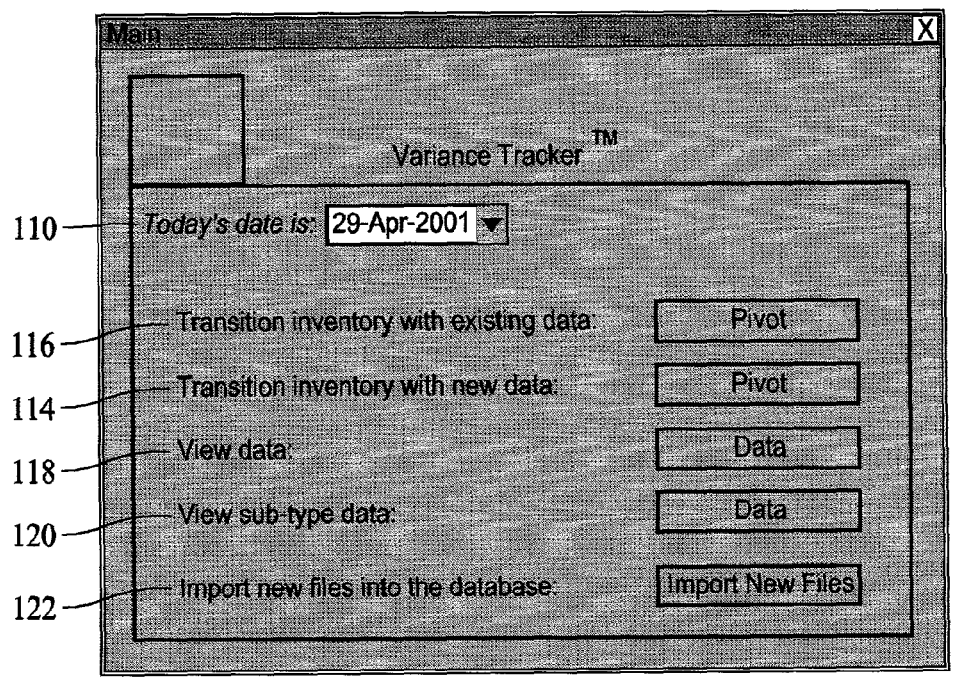
FIG. 12 is a screen shot of another example user interface.

As shown in FIG. 12, a user can select "Transistion Inventory with existing data" 116, which results in display of a pivot table with the most recently accessed data. A user also can select "Transition Inventory with new data" 114, which results in display of a pivot table with newly generated data and the selected date. A user can also select "View data" 118, which results in display of data for which the pivot table is being displayed. A user can also select "View sub-type data" 120, which results in display of sub-type data. A user can further select "Import new files into the database" 122, which results in importing new data into the system using a user interface as shown in FIG. 13.

Figure 13:
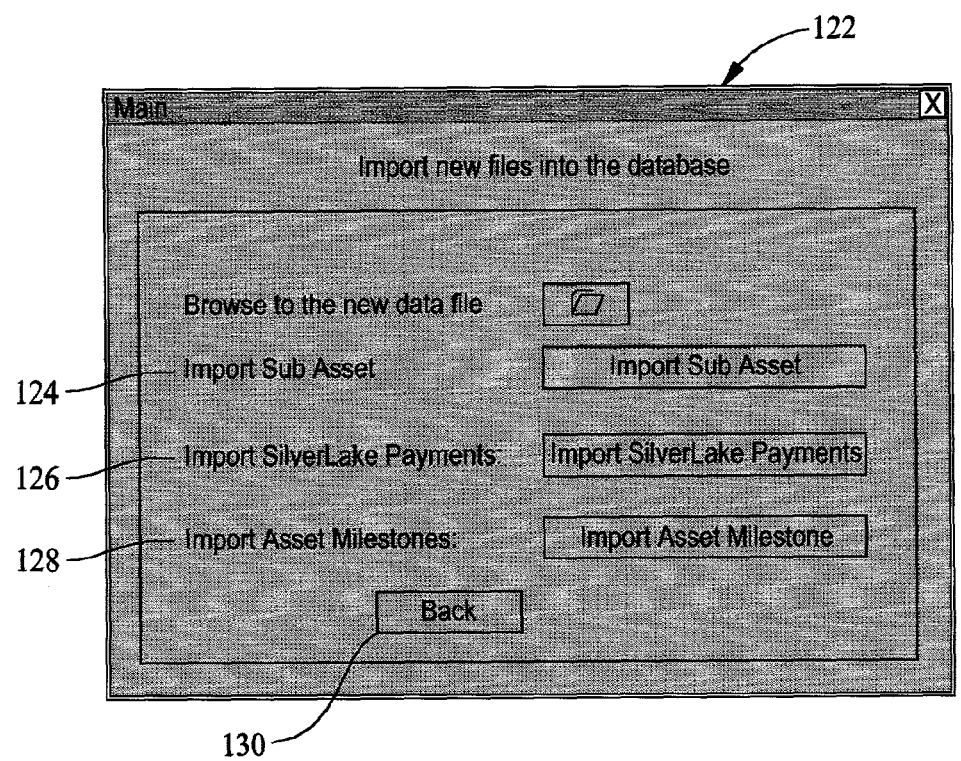
FIG. 13 is a screen shot of an example user interface in connection with importing files into the database.

As shown in FIG. 13, the import new files user interface includes a browse selecting button so that a user can select a data file to import. Selecting the "Import Sub Asset" button 124 results in importing the sub-asset data from the data file. Selecting the import payments buttons 126 (in the example, shown as the "Import Silverlake Payments"

The system described above provides an ability to analyze and understand variances between planned and actual performance at the portfolio level, and improved forecast capability for near and long term. In addition, the system provides the ability to adjust portfolio management to improve efficiency, as well as analytical data for future (i.e., planned purchases) portfolio valuation and acquisition.

While the invention has been described in terms of various specific embodiments, those skilled in the art will recognize that the invention can be practiced with modification within the spirit and scope of the claims.

What is claimed is:

1. A method for assessing a loan portfolio comprising a plurality of non-performing loans, said method comprising the steps of:

assigning at least one characteristic to each loan included within the portfolio including at least one of size of outstanding balance, nature of collateral security, lien information, historical payment performance, litigation status, and underwritten valuation;

identifying a current milestone for each loan included within the portfolio at a selected time of assessment from a series of predefined milestones, wherein the series of predefined milestones represent different stages that non-performing loans experience prior to resolution including at least one of not contacted, in negotiation, scheduled for approval, approved, approved delinquent, closed, closed delinquent, paid-in-full, and foreclosed;

creating a business plan for each loan included within the portfolio including planned collections and timing of collections for each loan;

electronically segmenting the loan portfolio based on the at least one characteristic assigned to each loan;

electronically determining planned collections for each loan for the selected time of assessment;

electronically determining actual collections for each loan for the selected time period of assessment;

electronically populating a spreadsheet identifying the current milestone and a cumulative variance between planned collections and actual collections at the current milestone for each loan; and electronically determining a contribution of a portfolio segment to an overall cumulative loan portfolio variance, wherein the portfolio segment includes each loan included within the portfolio having an assigned characteristic that correlates with a loan characteristic selected by a user for analysis.

2. A method according to claim 1 wherein the current milestone for at least one loan comprises one of not contacted, in negotiation, scheduled for approval, approved, approved delinquent, closed, closed delinquent, paid-in-full, and foreclosed.

3. A method according to claim 1 wherein electronically determining planned collections comprises the steps of denormalizing a business plan to create a list-oriented format for each loan and each planned payment, coding planned payments to an index of time, and determining cumulative planned collections for each loan.

4. A method according to claim 1 wherein electronically determining actual collections comprises the steps of coding actual payments for each loan to an index of time and determining cumulative actual payments for each loan.

5. A variance tracking system, said database comprising a computer coupled to a database said database comprising a memory storage having data stored therein, said database comprising:

at least one characteristic associated with each of a plurality of non-performing loans included within a loan portfolio, wherein the at least one characteristic assigned to each loan includes at least one of size of outstanding balance, nature of collateral security, lien information, historical payment performance, litigation status, and underwritten valuation;

a current milestone for each of the plurality of loans, wherein the current milestone is included within a series of predefined milestones, wherein the series of predefined milestones represent different stages that non-performing loans experience prior to resolution including at least one of not contacted, in negotiation, scheduled for approval, approved, approved delinquent, closed, closed delinquent, paid-in-full, and foreclosed;

a business plan for each of the plurality of loans including planned payments and timing of payments for each loan;

segments of the loan portfolio based on the at least one characteristic assigned to each loan;

actual payments for each loan;

indexes of time associated with each planned payment and with each actual payment;

a variance between each planned payment and each actual payment; and wherein the computer is programmed to electronically determine a contribution of each portfolio segment to an overall cumulative loan portfolio variance, wherein each portfolio segment includes each loan included within the portfolio having an assigned characteristic that correlates with a loan characteristic selected by a user for analysis.

6. A computer program for controlling operation of a computer to determine variance in a loan portfolio of non-performing loans, said computer program executable to control the computer to:

assign at least one characteristic to each loan included within the portfolio including at least one of size of outstanding balance, nature of collateral security, lien information, historical payment performance, litigation status, and underwritten valuation;

associate each loan in the portfolio with one of a plurality of milestones, wherein the milestones represent different stages that non-performing loans experience prior to resolution including at least one of not contacted, in negotiation, scheduled for approval, approved, approved delinquent, closed, closed delinquent, paid-in-full, and foreclosed;

create a business plan for each loan included within the portfolio including planned collections and timing of collections for each loan;

segment the loan portfolio based on the at least one characteristic assigned to each loan;

electronically determine cumulative planned collections for each loan for a selected time of assessment;

electronically determine cumulative actual collections for each loan for the selected time period of assessment;

electronically determine a cumulative variance for each loan for the selected time period of assessment based on the cumulative planned collections and cumulative actual collections; and electronically determine a contribution of each portfolio segment to an overall cumulative loan portfolio variance, wherein each portfolio segment includes each loan included within the portfolio having an assigned characteristic that correlates with a loan characteristic selected by a user for analysis.

7. A computer program according to claim 6 further executable to control a computer to populate a spreadsheet identifying a current milestone and a cumulative variance between planned collections and actual collections at the milestone for the loan.

8. A computer program according to claim 6 wherein the milestone for at least one loan comprises one of not contacted, in negotiation, scheduled for approval, approved, approved delinquent, closed, closed delinquent, paid-in-full, and foreclosed.

9. A computer program according to claim 6 wherein to determine planned collections, said program is executable to control the computer to denormalize a business plan to create a list-oriented format for each loan and each planned payment, and coding planned payments to an index of time.

10. A computer program according to claim 6 wherein to determine actual collections, said program is executable to control the computer to code actual payments for each loan to an index of time.

11. A variance tracker system for tracking variance in a loan portfolio of non-performing loans, said system comprising:

a database comprising a memory storage having data stored therein, said data comprising at least one characteristic assigned to each loan including at least one of size of outstanding balance, nature of collateral security, lien information, historical payment performance, litigation status, and underwritten valuation; and a processor coupled to said database, said processor programmed to:

associate each loan in the portfolio with a current milestone at a selected time of assessment from a series of predefined milestones, wherein the series of predefined milestones represent different stages that non-performing loans experience prior to resolution including at least one of not contacted, in negotiation, scheduled for approval, approved, approved delinquent, closed, closed delinquent, paid-in-full, and foreclosed;

store a business plan within the database for each loan included within the portfolio including planned collections and timing of collections for each loan;

segment the loan portfolio based on the at least one characteristic assigned to each loan;

determine cumulative planned collections for each loan for a selected time of assessment;

determine cumulative actual collections for each loan for the selected time period of assessment;

determine a cumulative variance for each loan for the selected time period of assessment based on the cumulative planned collections and cumulative actual collections; and determine a contribution of each portfolio segment to an overall cumulative loan portfolio variance, wherein each portfolio segment includes each loan included within the portfolio having an assigned characteristic that correlates with a loan characteristic selected by a user for analysis.

12. A system according to claim 11 wherein said processor is further programmed to populate a spreadsheet identifying a current milestone and a cumulative variance between planned collections and actual collections at the milestone for the loan.

13. A system according to claim 11 wherein the milestone for at least one loan comprises one of not contacted, in negotiation, scheduled for approval, approved, approved delinquent, closed, closed delinquent, paid-in-full, and foreclosed.

14. A system according to claim 11 wherein to determine planned collections, said processor is programmed to denormalize a business plan to create a list-oriented format for each loan and each planned payment, and coding planned payments to an index of time.

15. A system program according to claim 11 wherein to determine actual collections, said processor is programmed to code actual payments for each loan to an index of time.

16. A method according to claim 1 wherein the at least one characteristic assigned to each loan including real estate secured, other collateral secured, and unsecured.

17. A method according to claim 1 further comprising:

selecting a portfolio segment to view in the spreadsheet; and populating the spreadsheet with a current milestone and a cumulative variance between planned collections and actual collections at the current milestone for the loan segment.

\* \* \* \* \*

UNITED STATES PATENT AND TRADEMARK OFFICE
CERTIFICATE OF CORRECTION

PATENT NO.         : 7,454,383 B2                                              Page 1 of 1
APPLICATION NO.    : 10/035968
DATED              : November 18, 2008
INVENTOR(S)        : Keyes et al.

It is certified that error appears in the above-identified patent and that said Letters Patent is hereby corrected as shown below:

Column 6, line 45, after "as the 'Import Silverlake Payments'" insert -- button) results in importing the payment data. Selecting the Import Asset Milestone button 128 results in importing the asset milestone data. Selecting the "Back" button 130 results in returning processing to the main interface screen (e.g., the screen shown in Figure 10). --.

In Claim 5, column 7, line 42, delete "A variance tracking system, said database comprising a computer coupled to a database said" insert therefor -- A variance tracking system comprising a computer coupled to a database, said --.

Signed and Sealed this

Ninth Day of June, 2009

JOHN DOLL
*Acting Director of the United States Patent and Trademark Office*